United States Patent
Gelfuso

(10) Patent No.: US 7,216,972 B1
(45) Date of Patent: May 15, 2007

(54) GLASSES FOR MOUNTING TO BOTH REARWARD AND FORWARD FACING CAPS

(76) Inventor: Russell Gelfuso, 1304 New London Ave., Cranston, RI (US) 02920

( * ) Notice: Subject to any disclaimer, the term of this patent is extended or adjusted under 35 U.S.C. 154(b) by 0 days.

(21) Appl. No.: 11/325,878

(22) Filed: Jan. 5, 2006

Related U.S. Application Data

(60) Provisional application No. 60/640,355, filed on Jan. 3, 2005.

(51) Int. Cl.
*G02C 3/00* (2006.01)

(52) U.S. Cl. .................. 351/155; 351/156; 351/158; 2/10; 2/453

(58) Field of Classification Search .................. 351/41, 351/153, 155, 156, 158; 2/10, 12, 13, 15, 2/452, 453
See application file for complete search history.

(56) References Cited

U.S. PATENT DOCUMENTS 4,781,451 A * 11/1988 McAllen ...................... 351/156
6,892,393 B1 * 5/2005 Provost et al. .................. 2/10

* cited by examiner

*Primary Examiner*—Huy Mai
(74) *Attorney, Agent, or Firm*—Robert J Doherty

(57) ABSTRACT

Glasses adapted to be mounted on caps having an interior band such that terminal temple connecting portions are mounted on such band at two circumferentially-spaced positions, and the glasses so mounted are further adapted to upwardly pivot such that the glasses are easily utilized with caps worn in both the brim rearward and forward positions.

19 Claims, 19 Drawing Sheets

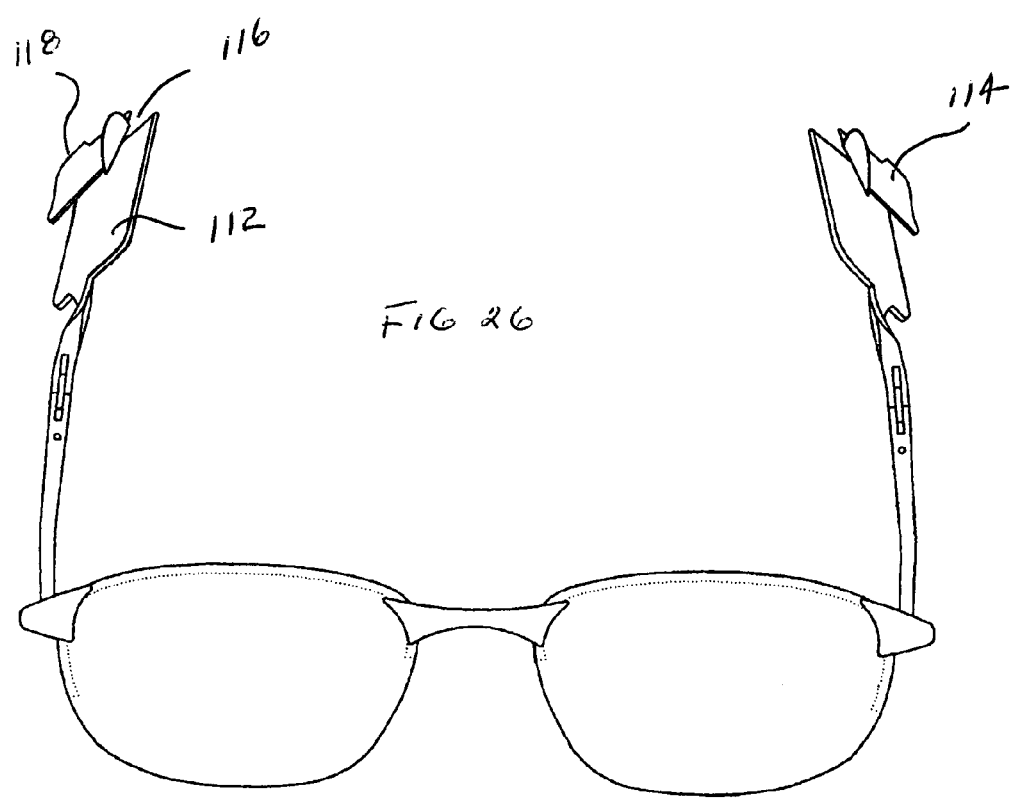

US 7,216,972 B1

GLASSES FOR MOUNTING TO BOTH REARWARD AND FORWARD FACING CAPS

This application claims the benefit of U.S. Provisional Patent Application Ser. No. 60/640,355 filed Jan. 6, 2005.

BACKGROUND OF THE INVENTION

This invention relates to a pair of glasses adapted to be attached to caps worn by humans and more specifically for utilization when caps are worn backwards, that is, with the cap's brim or visor facing to the rear. Visored caps such as baseball caps and the like have realized increased acceptance and importance in today's culture, and the habit of wearing such caps in the rearward position, that is, with the visor portion placed to the rear, is popular. It is also popular to mount eyeglasses, safety glasses and sunglasses to such caps such that the glasses may be disposed in a storage position and then pivoted or otherwise disposed to a use position with respect to the wearer, i.e., combination visored cap with glasses mounted thereon.

Despite the popularity of wearing such visored caps in the rearward position, the construction of the glasses to be mounted thereon are almost entirely structured so as to be clipped, suspended or otherwise attached or function with respect to the cap's brim or visor. Thus mounted, the glasses so attached to the cap will, of course, be proximate to the rear of the person's head when the cap is disposed in the rearward position and thus rendering the functionality of such mounted glasses useless. Examples of such visor or brim-oriented glasses/cap mountings include those shown in the following U.S. patents: U.S. Pat. No. 857,838 issued Jun. 25, 1907; U.S. Pat. No. 4,179,753 issued Dec. 25, 1979; U.S. Pat. No. 5,052,054 issued Oct. 1, 1991; U.S. Pat. No. 5,615,413 issued Apr. 1, 1997; U.S. Pat. No. 5,933,862 issued Aug. 10, 1999; U.S. Pat. No. 6,739,718 issued May 24, 2004; and U.S. Pat. No. 6,757,914 issued Jul. 6, 2004.

While some attempts have been made to provide glasses which include some attachment mechanism to enable use while the hat or cap's brim faces to the back or towards either side, the need still exists for a pair of glasses adapted for attachment to a cap such that the wearer may utilize the glasses when the cap is worn in the rearward facing position in a simple, straightforward and intuitively functional manner.

SUMMARY OF THE INVENTION

Accordingly, a primary object of this invention is to allow users to instantly attach and detach their choice of sunglasses, safety glasses and prescription eyeglasses to any headwear with an interior band such as a baseball-type cap such that the cap can be comfortably worn with the brim facing in any direction.

Another object of this invention is to improve comfort by eliminating contact by the glasses with the wearer's ears and hinged temples that wrap around the wearer's ears as shown in prior art.

An additional object of this invention is to prevent the eyeglass frames from irritating the wearer by sliding down the nose by eliminating the traditional nosepieces as shown in prior art.

An additional object of this invention is to provide safe storage of the glasses when they are not in use without having to carry them.

A further object of this invention is to attach a pair of eyeglasses to the hat or cap in a manner that does not alter or damage the cap in any way.

A still further object of this invention is to provide the wearer's eyes protection from the sun by the lenses even when the cap is being worn with the brim facing in any position other than toward the front.

These and other objects of the invention are accomplished by the provision of a pair of eyeglasses having a frame and a pair of temple members rearwardly extending therefrom and wherein each said temple members terminate in an end portion adapted to attach to the inner band of the cap at spaced circumferential portions thereof and wherein the main temple portions are hingedly connected to the temple attachment portion.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 26 is a front perspective view of the embodiment shown in FIG. 24;

DESCRIPTION OF THE INVENTION

Figure 1:
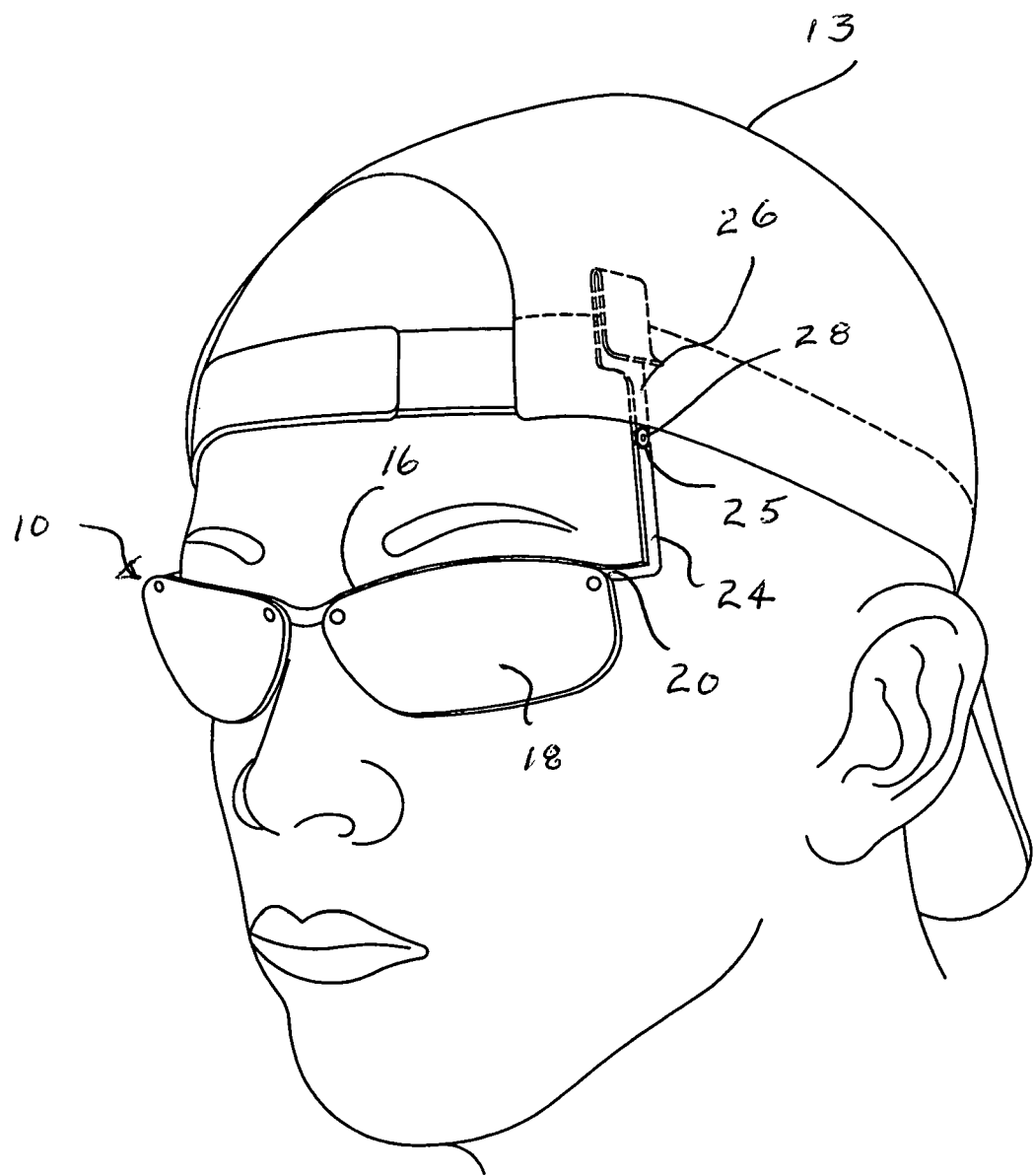
FIG. 1 is a front perspective view showing the glasses of the present invention mounted upon a cap worn backwards and in the active use position.

The glasses 10 of the present invention are depicted in a position mounted to the inner headband 12 of a cap 13. Such headbands 12 generally extend circumferentially about the bottom inside portion of the top 14 of caps 13. The headband may terminate at the rear of the cap to provide for snap or Velcro-type head size adjustment. The glasses 10 include a frame 16 preferably of one-piece anodized aluminum or other suitable material that in turn supports a pair of eyepieces 18 by conventional means such as the rivets 20. Temples 22 are disposed at the lateral ends of the frame. The temples include forward or main temple portions 24 which rearwardly extend from the frame and are, in turn, connected at their ends 25 to rearwardly extending temple portions 26 via a pivot connection 28. The rearward extending portions of the temples 22 in turn each terminate in a connecting or attaching portion 30.

The temple connecting portions 30 include an inner flange 32, that is, an extension of the rearward temple portion 26, and an outwardly positioned flange 34 separated therefrom and connected thereto by a U-shaped bend or web 36. It should be pointed out that the rearwardly extending portion 26 is preferably bent or twisted such that the receiving groove 38 for the band 12 formed between the flanges 32 and 34 is disposed in a somewhat offset position such that the rearwardly extending portion 26 is readily adapted to receive the cap's band 14 without buckling or puckering, etc. The band 12 generally comprises a vertically oriented circumferentially extending fabric which is often the upturned periphery of the cap top 14 and includes a terminal edge 15 over which the groove 38 extends. The outer wall or flange 34 is also outwardly offset at its lower terminal portion 42 to form a lead-in to facilitate the receipt of the band 12.

Figure 2:
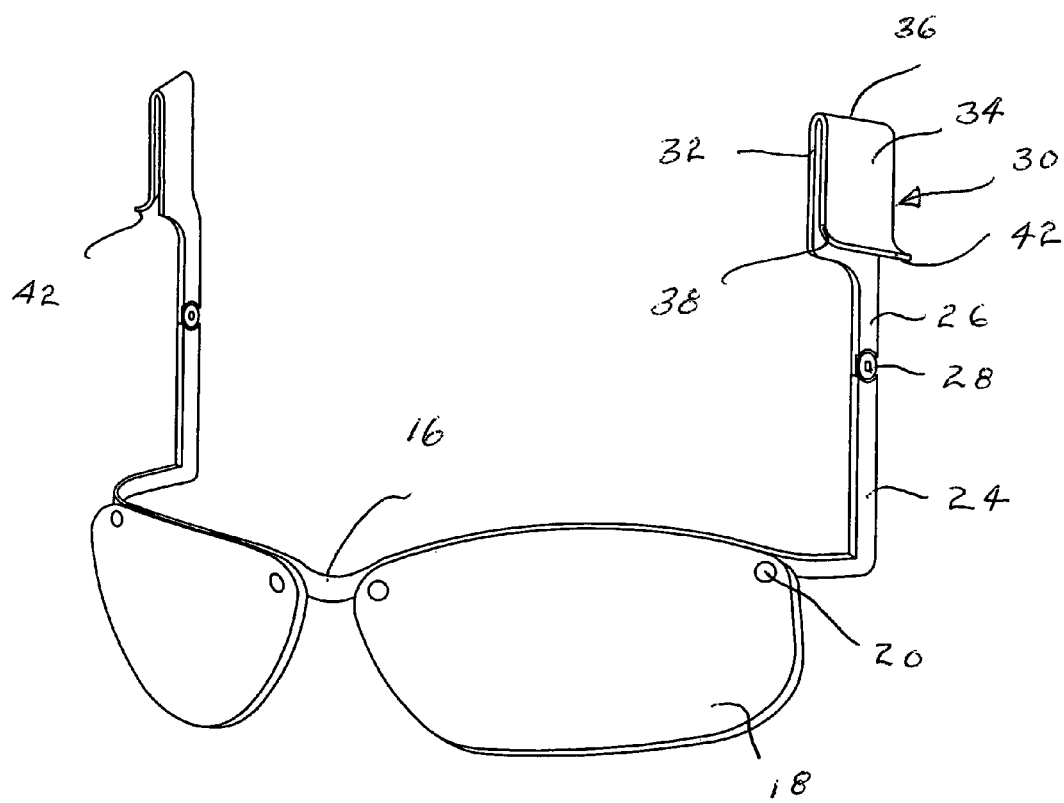
FIG. 2 is a similar perspective view of the glasses showing the temples in a straight mounting position.
Figure 3:
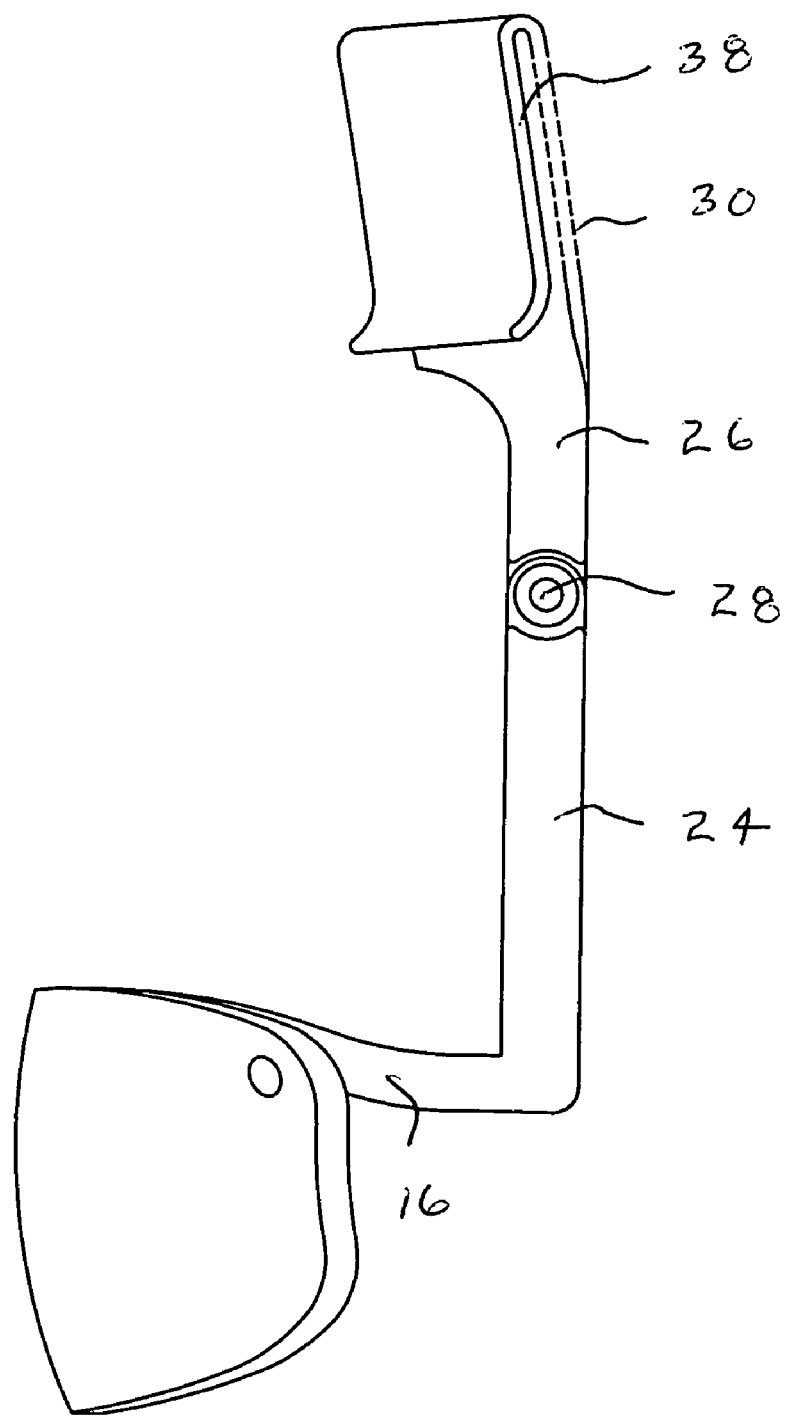
FIG. 3 is a right side elevational view of FIG. 2.
Figure 4:
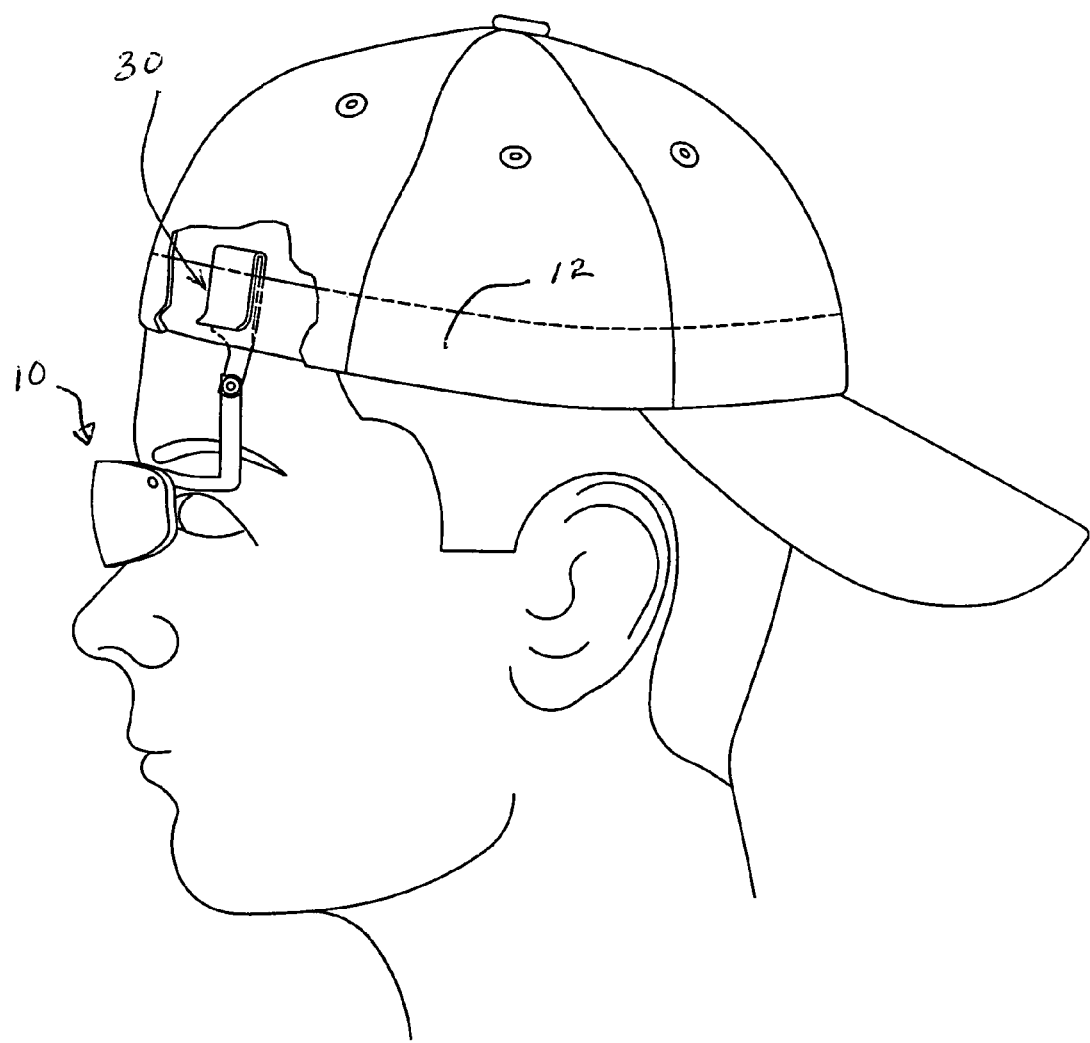
FIG. 4 is a view similar to FIG. 1 but taken from the left side thereof with parts cutaway to show the mounting of the terminal mounting portion of the eyeglass temples to the cap's circumferential inner band.
Figures 5, 6:
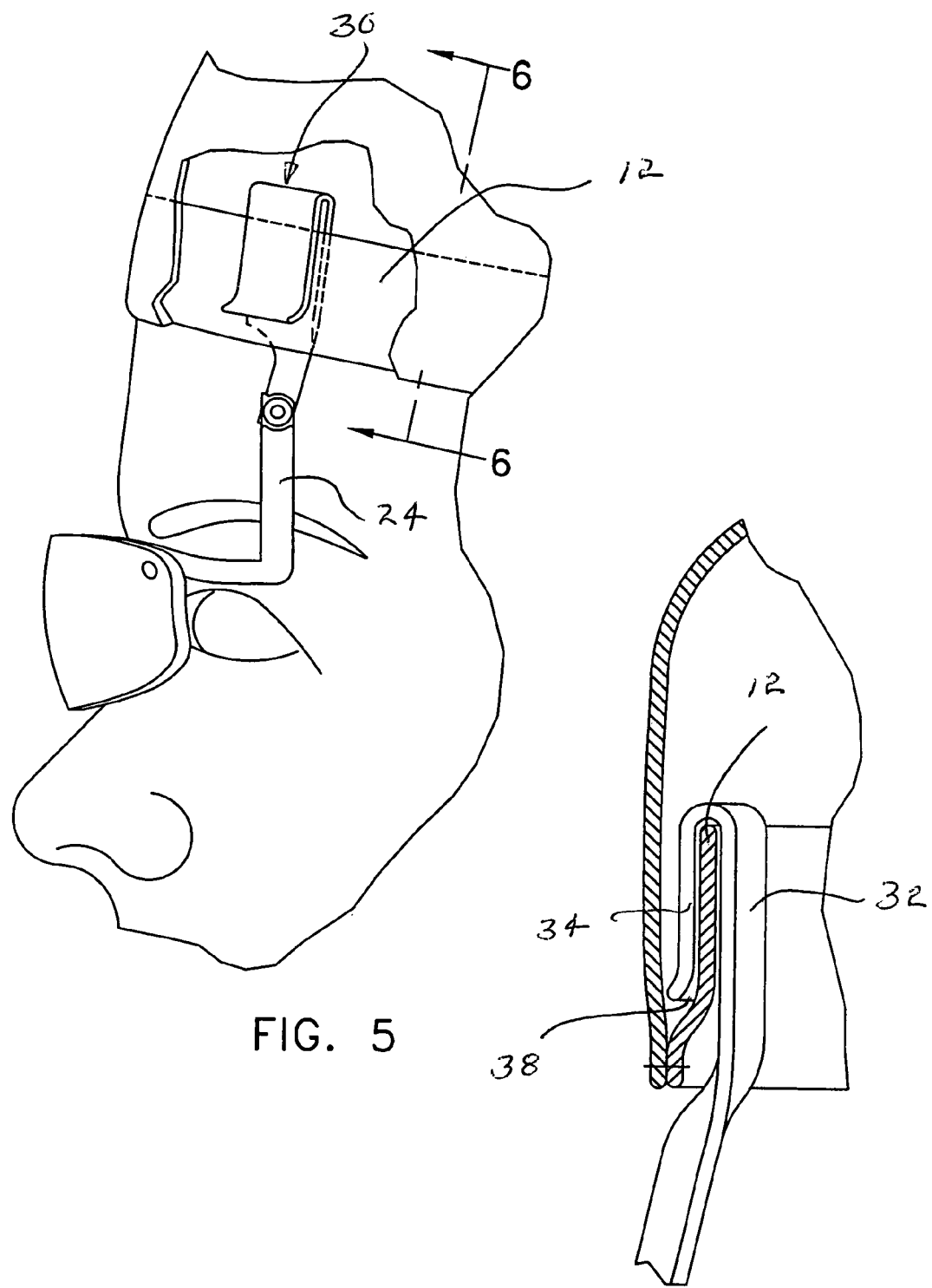
FIG. 5 is an enlarged partial view of FIG. 4.
FIG. 6 is a sectional view along the line 6—6 of FIG. 5.

The position of the rearward temple portion 26 is particularly shown in FIG. 2 wherein the rearward temple portion 26 forms a generally straight extension of the forward temple portion 24. This is the position in which the glasses 10 are preferably connected to different circumferentially-spaced portions of the headband 12 by simply placing both of the connector portions 30 into the cap's interior portion proximal the headband and slightly thereabove and then simply moving the glasses downwardly such that the headband is caught between the two flanges 32 and 34. In some cases, the rearward portion or at least the connector portion 30 of the temple 26 may be constructed of a somewhat soft metal such that the flanges 32 and 34 may be squeezed together to assure a tight connection with the headband 12; but in most cases, the groove or slot 38 is dimensioned such that a snug engagement is assured for average width bands 12. In this connection, it should also be brought out that once the cap is placed on one's head then the outer surfaces of the inner flanges 32 rest against the wearer's head and in that way the connecting portions 30 are, in effect, wedged between the cap's circumferential portions and one's head; and in this manner, the glasses are positioned such that they extend in front of the wearer's eyes without the need for a nose piece so as to contacting the wearer's face. The generally wide spacing of the two connection areas along the circumferential extent of the band 12 vis-à-vis the flanges provides a more stable mounting of the glasses such that they can be better manipulated between their use and rest (storage) positions. It should also be pointed out that the lateral extent of either of the flanges 32, 34 may be increased so as to, in effect, create wings as shown by the dotted lines in FIG. 8 so as to increase the flange to band contact and thus the stability of the mounting of the glasses to the cap. Also since there is no reliance upon the visor or brim of the cap 14, the glasses may be worn in the position depicted in FIGS. 1, 4, 5, 7 and 8 without interference from the brim or visor 15, that is, when the cap is worn in a rearward position. Because of the twist of the connectors 30, the grooves or slots 38 are preferably aligned along the path defined by the circumferential disposition of the band 12 at two circumferentially separated connection points.

Figure 7:
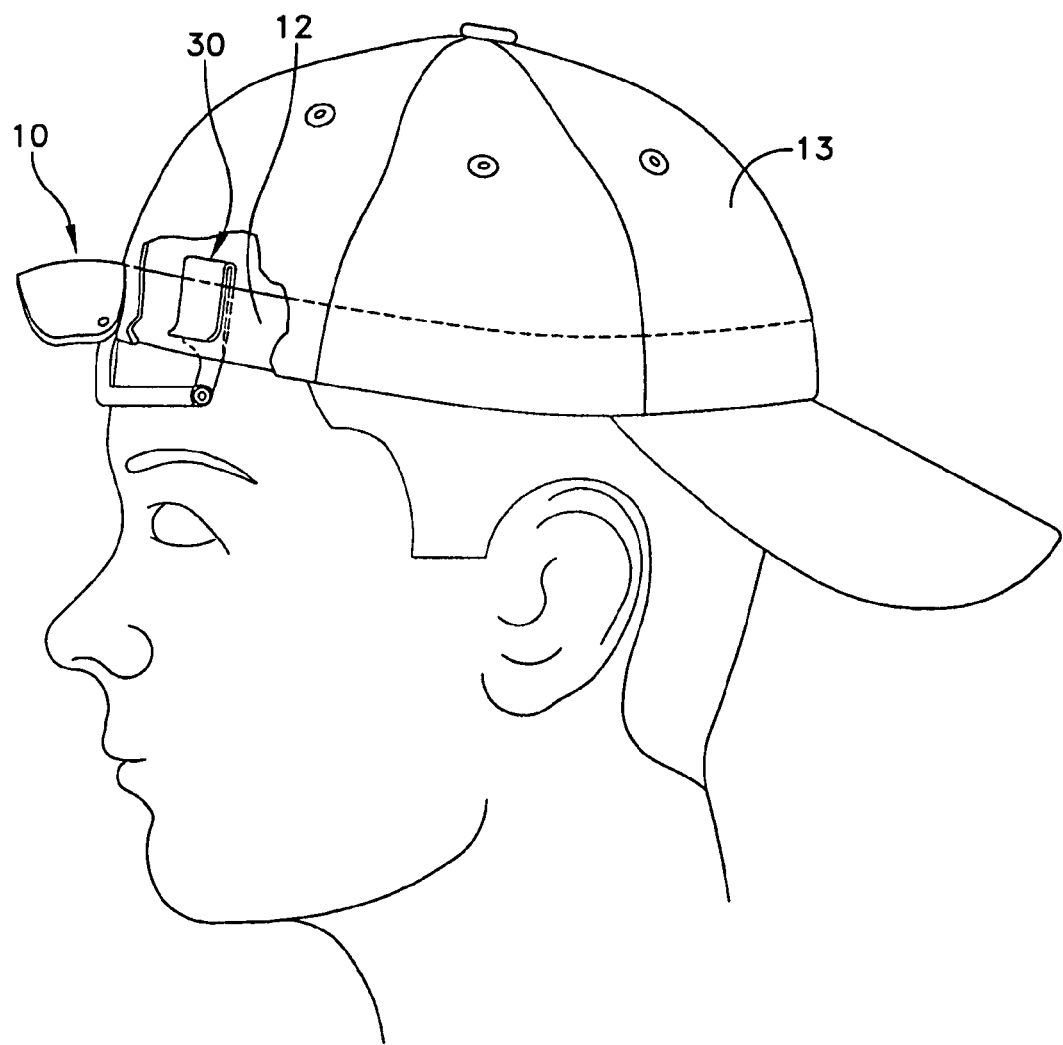
FIG. 7 is a view similar to FIG. 4 but showing the forward main portions of the temples upwardly pivoted to a nonuse/storage position adjacent the cap's rear portion.
Figure 8:
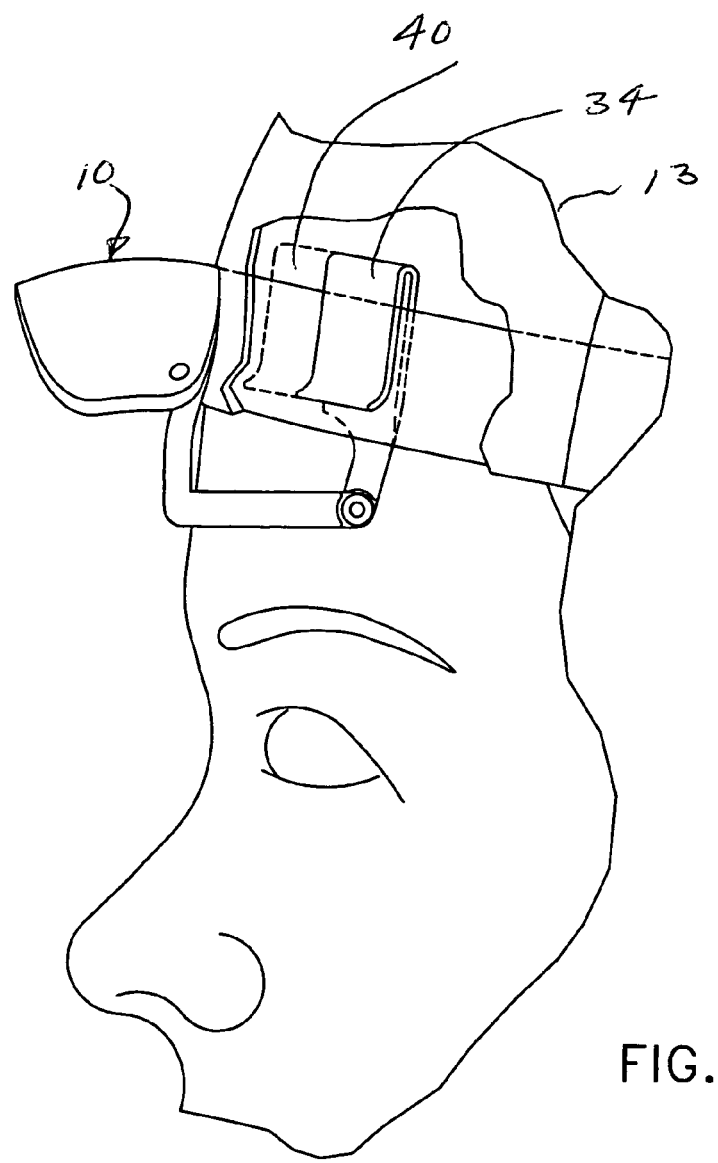
FIG. 8 is an enlarged partial perspective view of FIG. 7.
Figure 9:
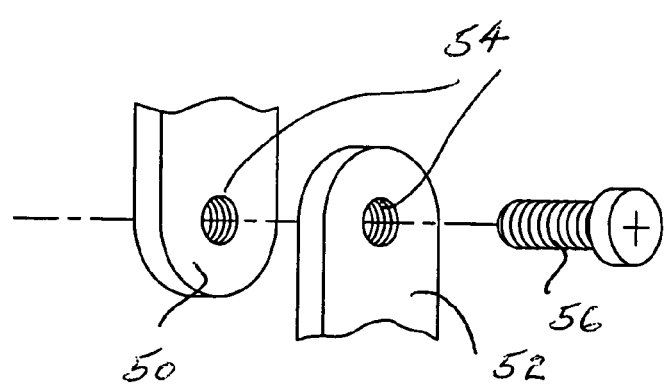
FIG. 9 is a partial perspective view of a pivot connection.

A pivot 28 connects the two temple portions, that is, the forward portion 24 and the rearward portion 26. In its simplest form as shown in FIG. 8 of the drawings, the pivots are formed by a terminal tongue 50 downwardly extending from the rearward extending temple portion 26 and an upwardly extending tongue 52 from the front temple portion 24. The tongues include aligned openings 54 for receipt of a screw or bolt 56 adapted to extend therethrough and connected on the opposite side. Tightening the screw or bolt 56 enables the two tongues to be brought together with a variety of force such that they may be adjusted to enable the temple portions to be pivoted vis-à-vis each other easily or with some degree of desired difficulty. In this way, the lower portion or forward portion temples pivoting about the pivots 28 enable the frame 20 to be upwardly swung to a glasses rest or storage position as best shown in FIGS. 7 and 8. Variations for the pivot connections 28 could be to provide the inner tongue 50 with a threaded opening and utilize a threaded bolt 56 extending through the upwardly extending tongue. Other variations may be provided including providing positive stops to control the relative movement of the lower temple portions 24 and thus the frame 20 about the rear temple portions 26 and the connecting portions positioned within the hat.

Figure 10:
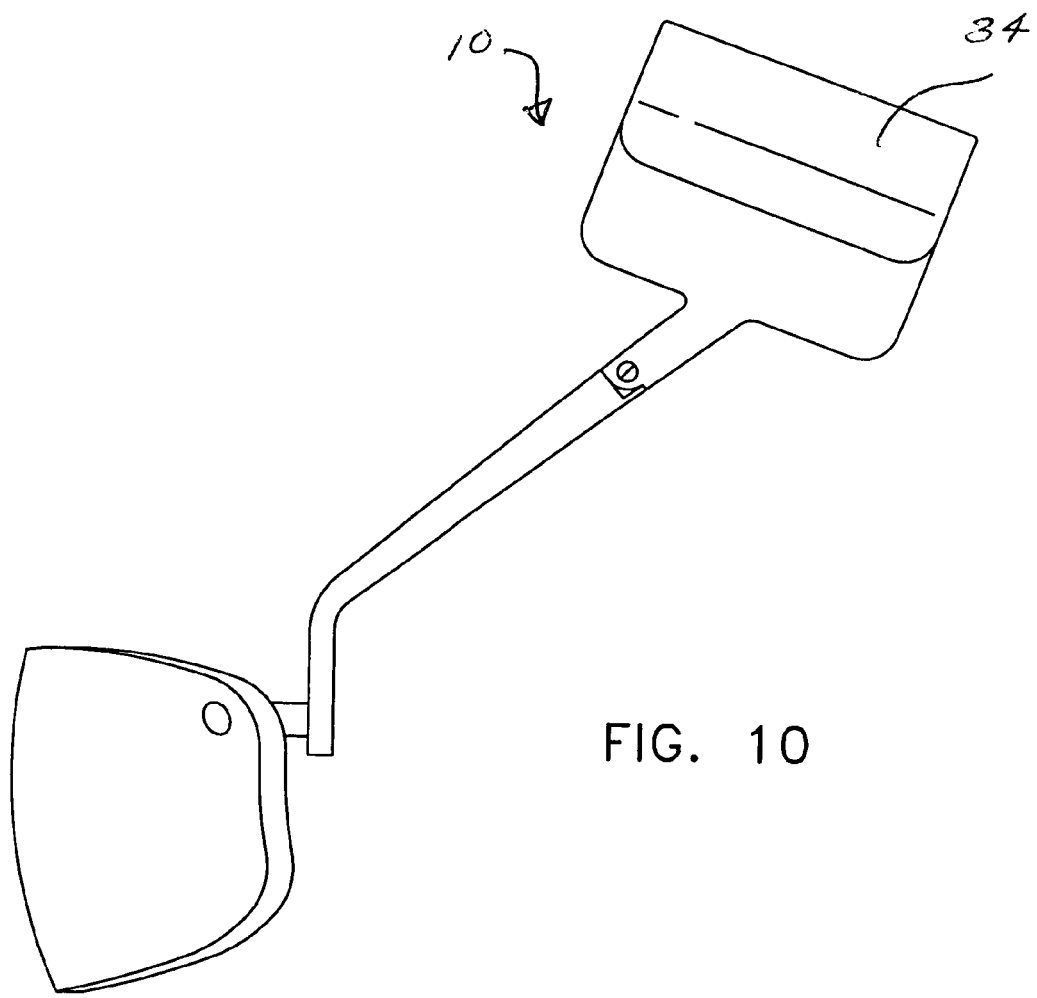
FIG. 10 is a side elevational view of the eyeglasses and the attaching portions wherein the pivot connection is a positive stop type.
Figure 11:
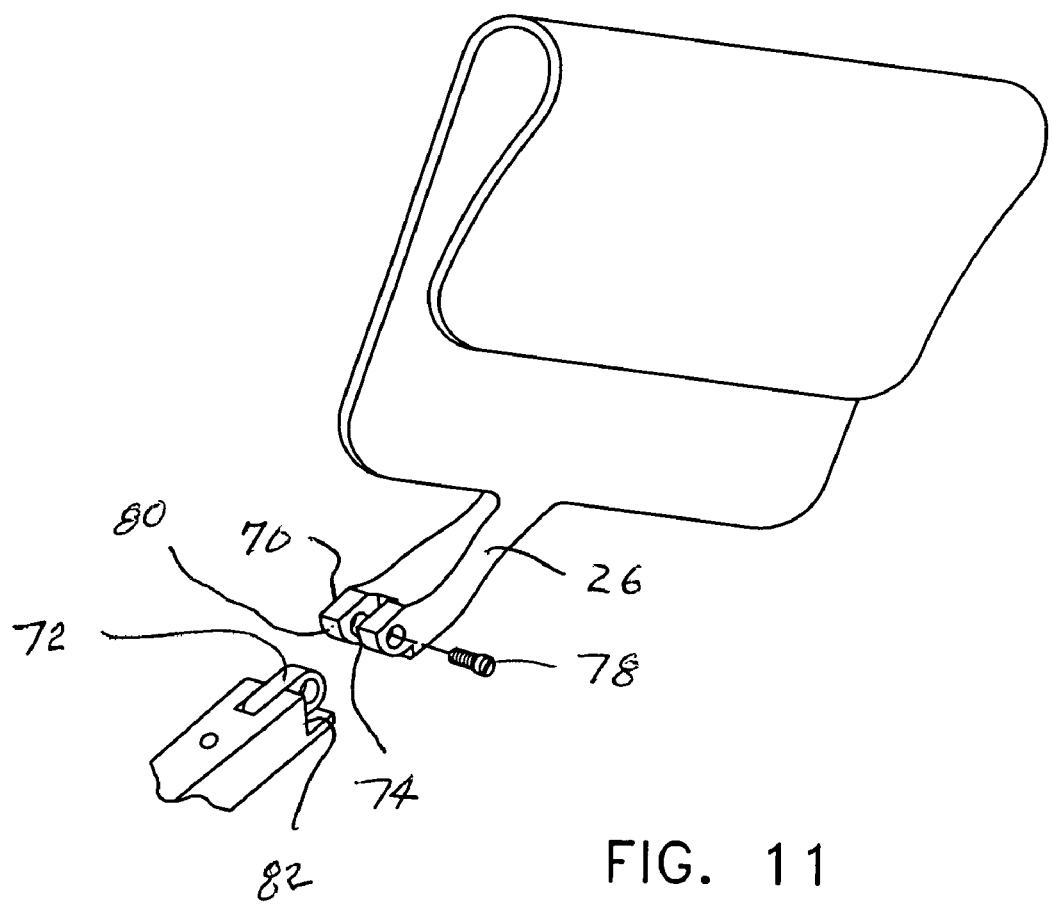
FIG. 11 is a detailed exploded view of the positive stop type pivot connection of FIG. 10.

A modified connecting portion 60 is depicted in FIG. 10 and is of a configuration wherein the lateral extent of the inner and outer flanges 62 and 64 respectively are materially increased so as to increase the contact area between the user's head and the connecting portions via the band 12 on opposite sides of the hat or cap when worn. This larger contact area increases the stability of the glasses when positioned thereon. In addition, the connection between the temple portions 24, 26 includes an angle limiting feature such that the forward temple portion may be pivoted approximately 90 degrees upwardly from the rearward portion 26 to move the glasses attached thereto to their upward storage position.

Figure 12:
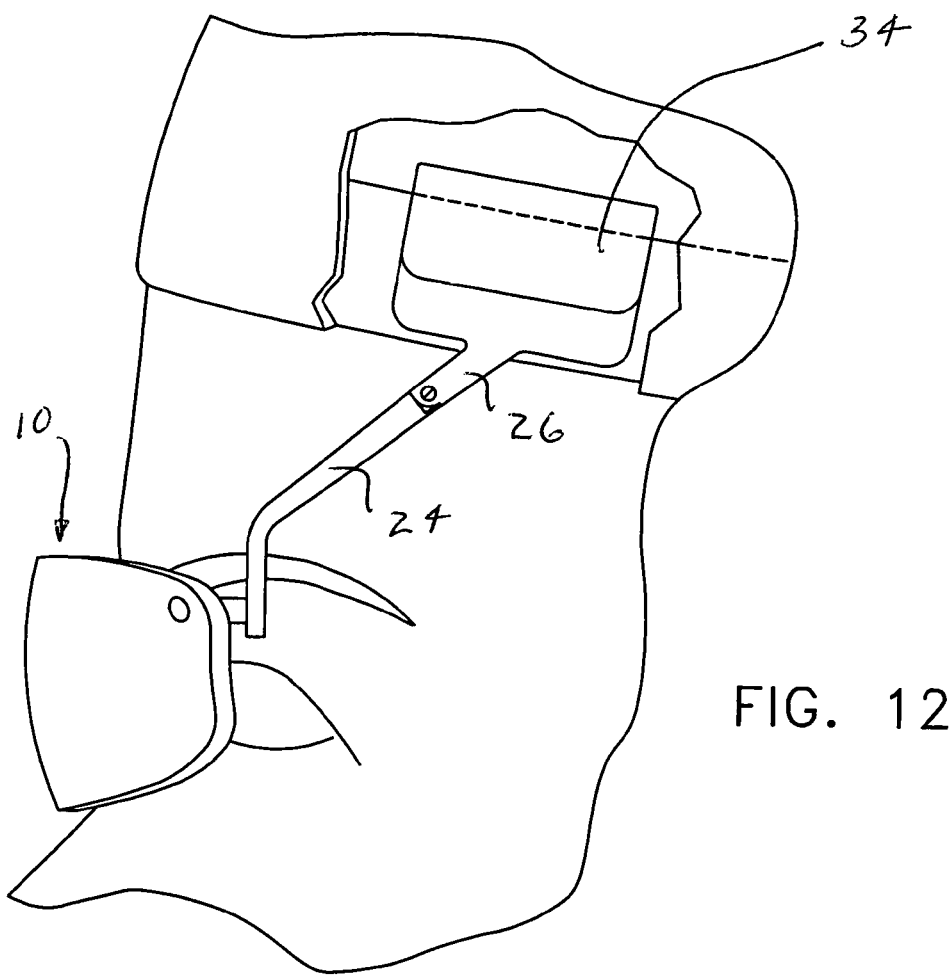
FIG. 12 is a partial side elevational view with parts broken way and showing the eyeglasses and attaching portions mounted on a hat or cap in a rearward facing position.
Figure 13:
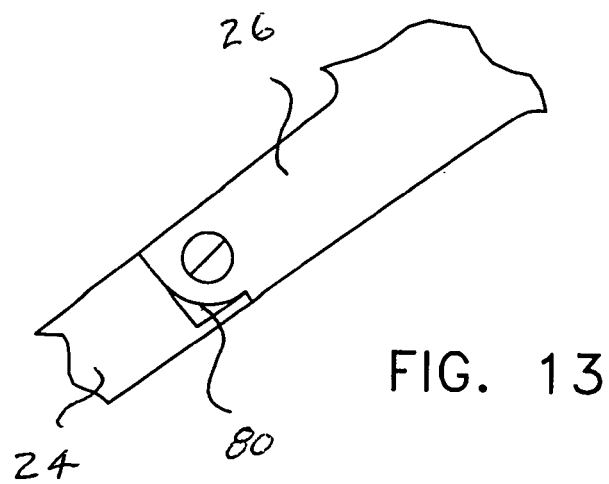
FIG. 13 is a detailed view of a portion of FIG. 12 showing the pivot connection.
Figure 14:
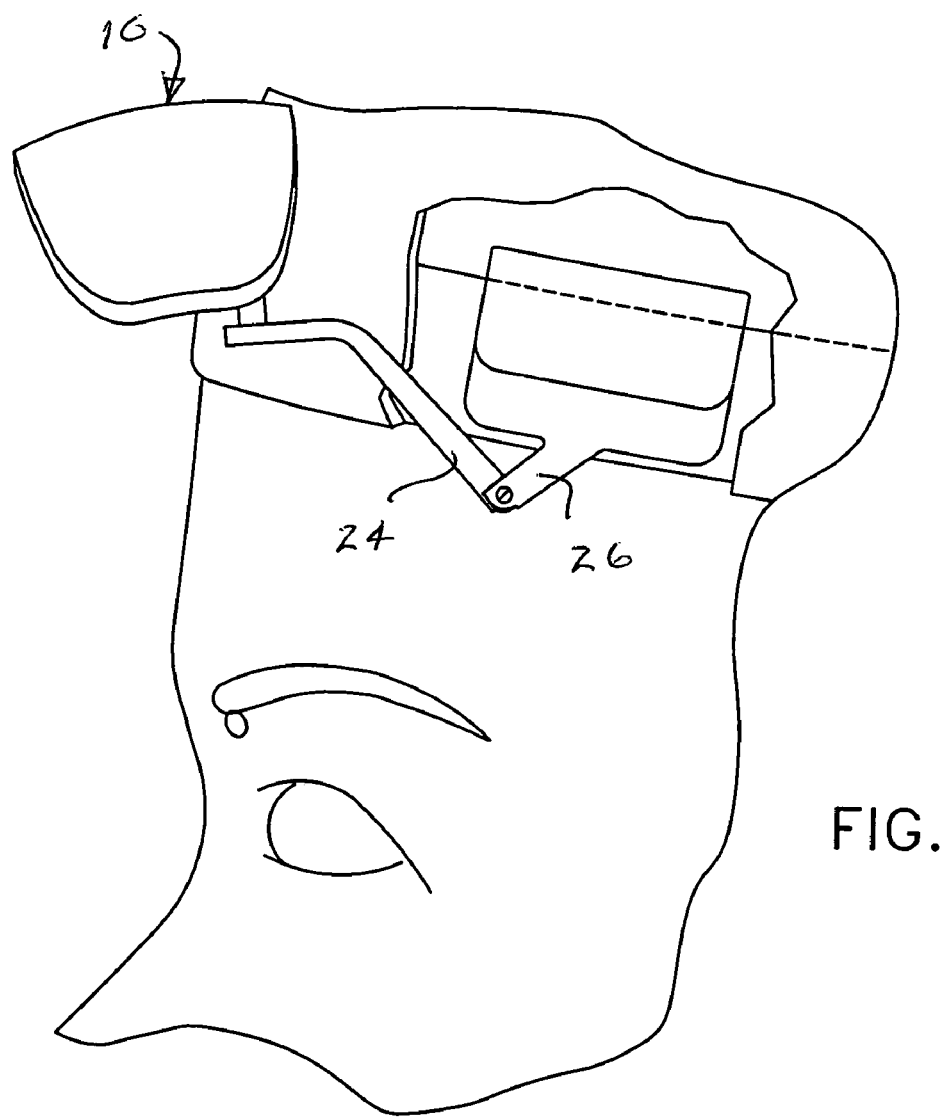
FIG. 14 is a view similar to FIG. 12 with the eyeglasses pivoted upward in their storage position.
Figure 15:
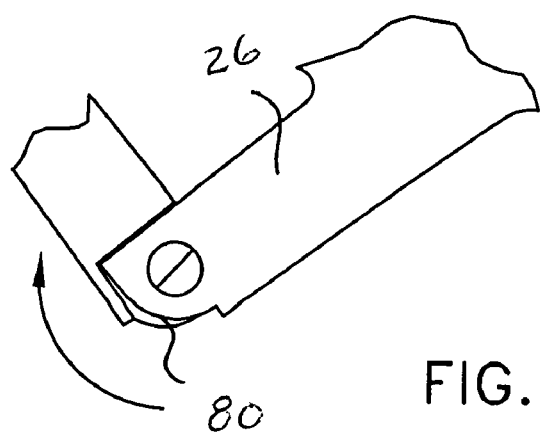
FIG. 15 is a detailed view of FIG. 14.
Figure 16:
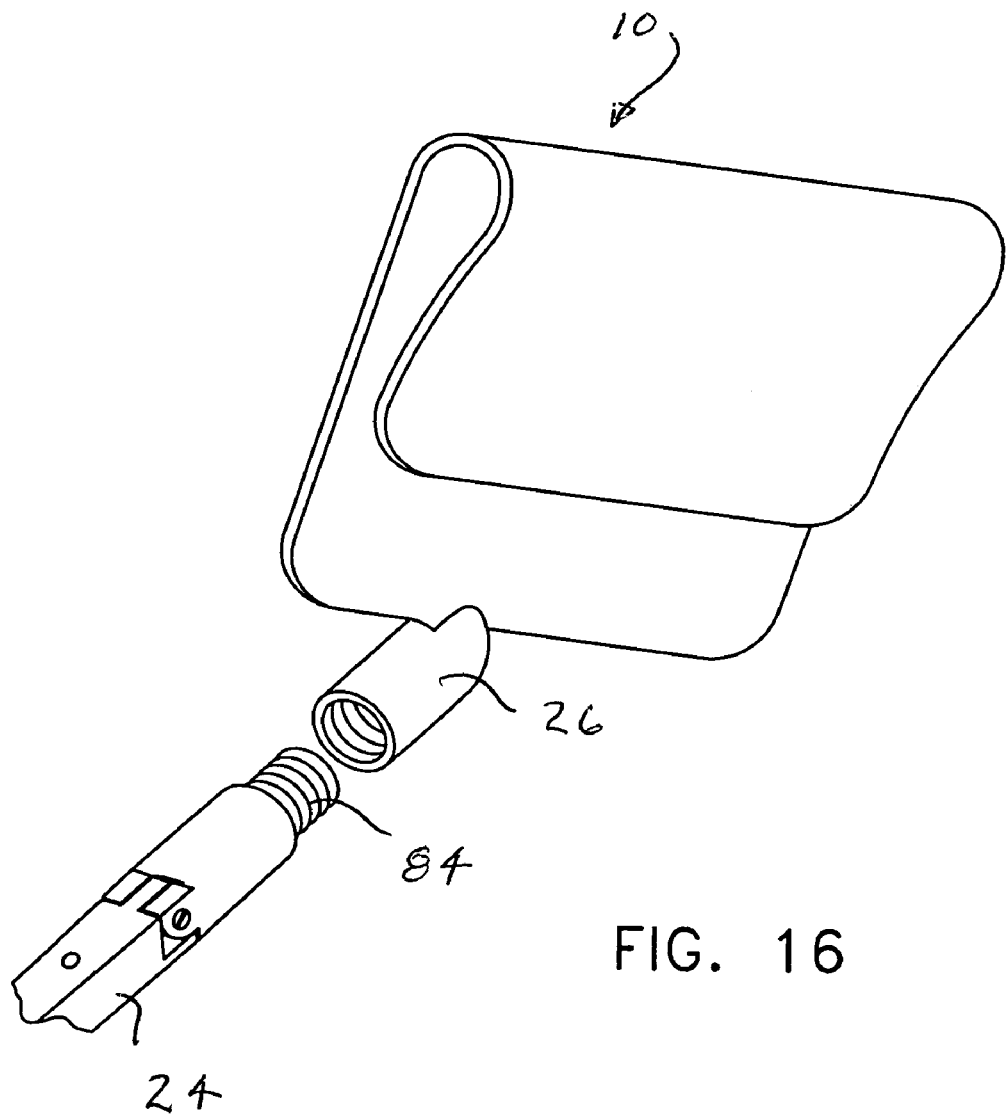
FIG. 16 is a detailed view of a modified form of securing the eyeglass temple to the attaching portions.

The connection between the portions 24, 26 includes a spring feature in the form of a bifurcated tongue 70 on the terminal end of the rearward temple portion adopted to engage a tongue 72 extending from the main temple portion 73. Both tongues 70, 72 have aligned openings 74, 76 respectively, and one of the tongue openings 74 is threaded such that a screw 78 may be used to attach the temple portions together. The terminal ends of the tongues 70 include curved ramps 80 which, in effect, form a spring engagement with the stopping surfaces 82 formed at the end of the main temple portion 24. In this way, the temple portions may be snapped approximately 90 degrees between alternate positions with respect to each other to create the use and storage positions of the glasses as shown in FIGS. 12 and 14 respectively. Also as shown in FIG. 16, the rearward temple portion may be attached to the connecting portion 60 via a threaded coupling 84 shown therein as an alternate feature.

Figure 17:
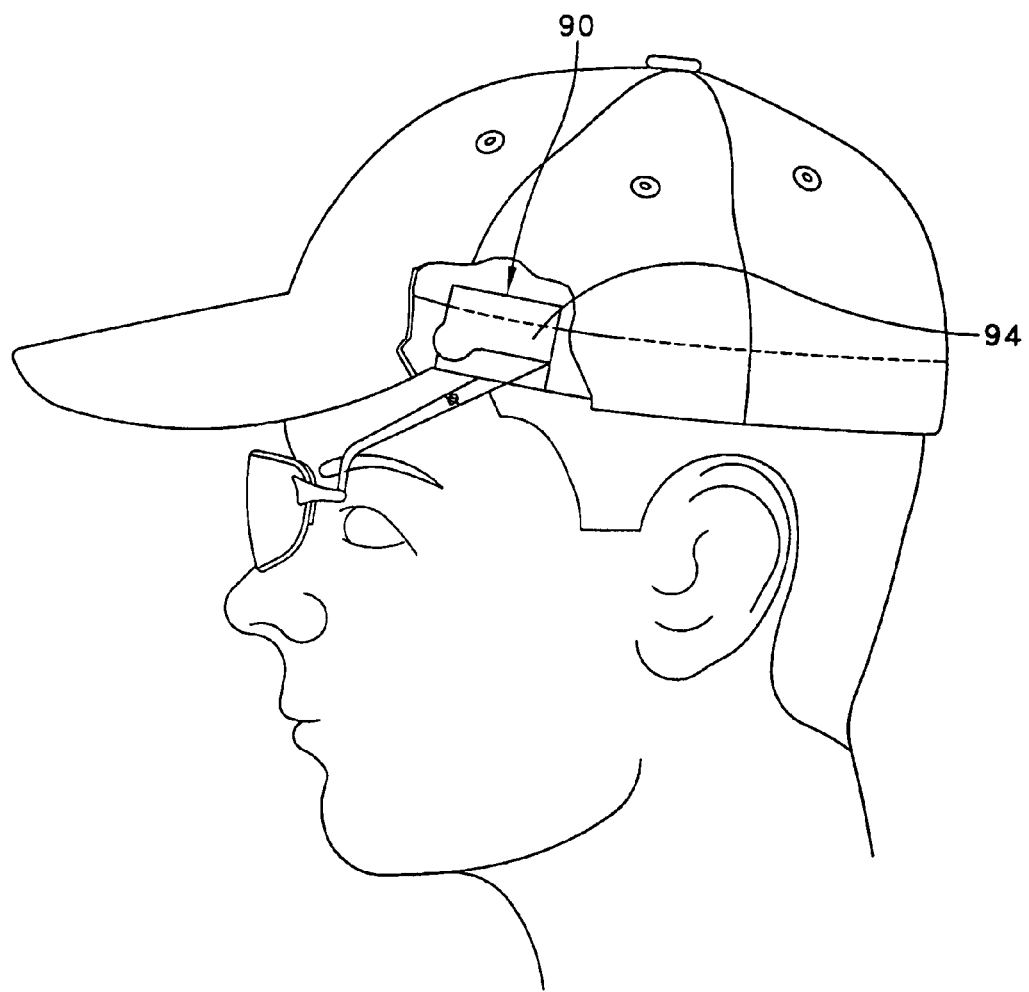
FIG. 17 is a side elevational view similar to FIG. 4 but showing the glasses mounted to the cap with the cap positioned in the forward facing position and wherein a modified version of the attaching portions shown in FIG. 10 are shown.
Figure 18:
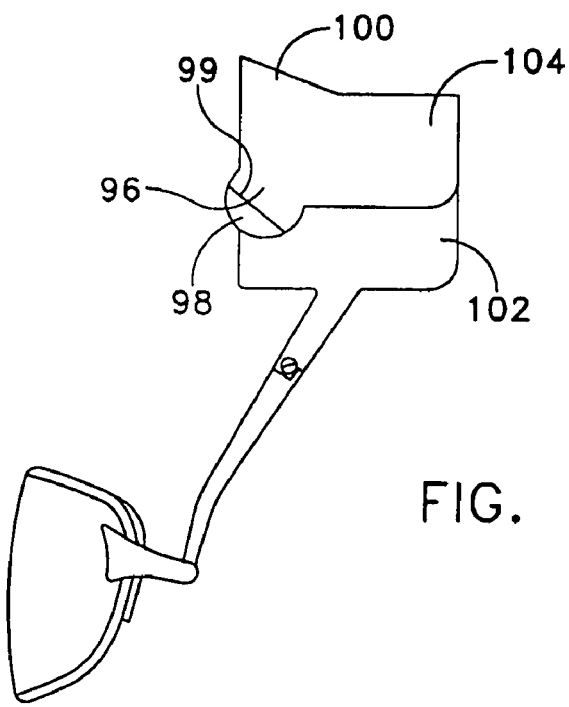
FIG. 18 is a side view of the device shown in FIG. 17 wherein the pivot is in its downwardly extended use position.
Figure 19:
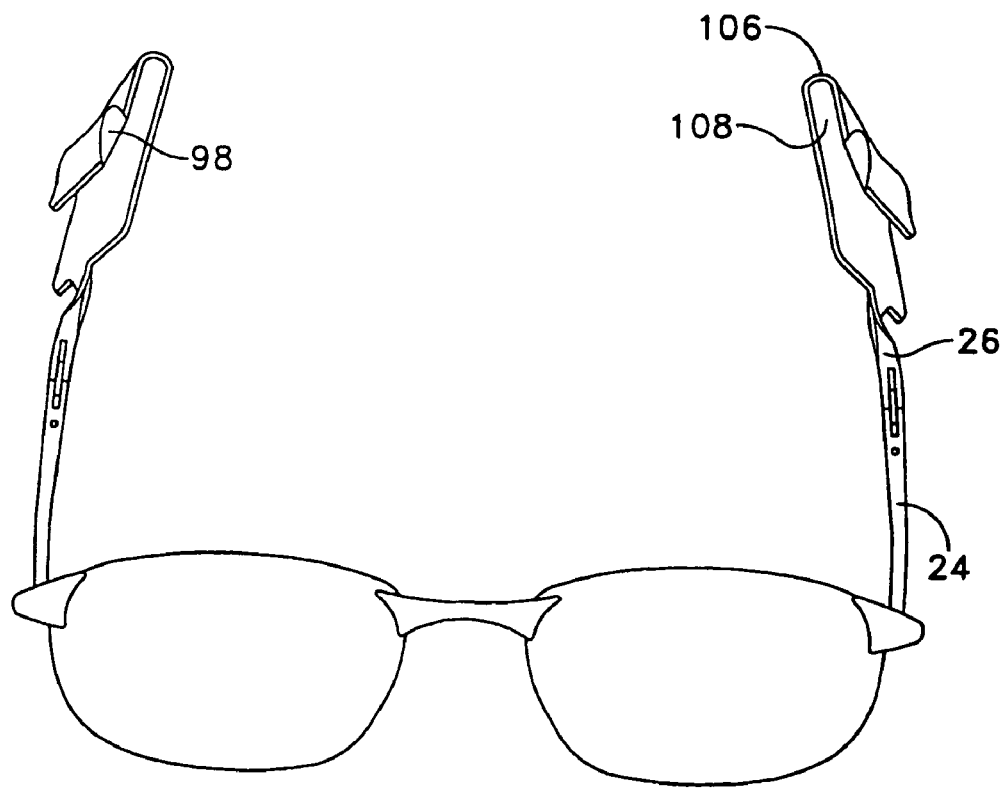
FIG. 19 is a top perspective view of FIG. 18.
Figure 22:
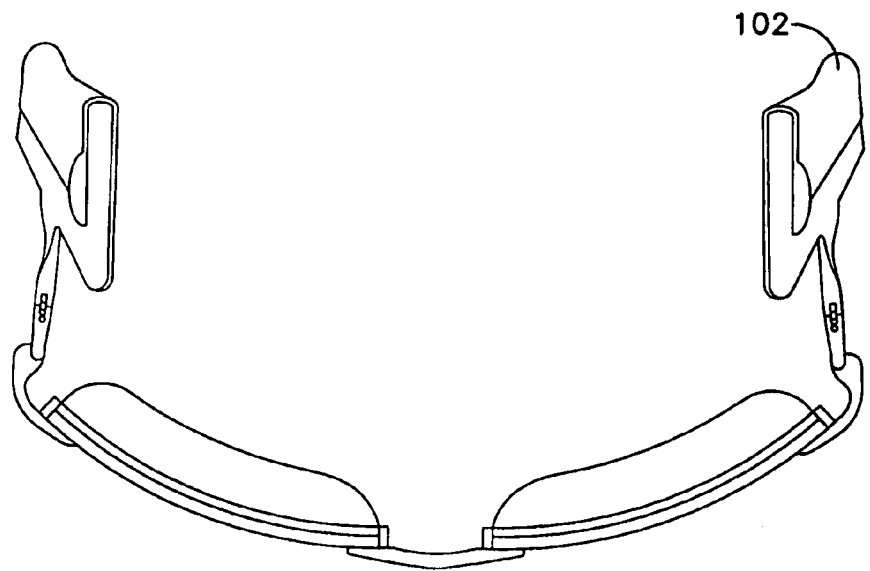
FIG. 22 shows a top perspective view of the glasses shown in FIG. 17 and illustrating a further embodiment of the attaching portions which include an outwardly bent tip and wherein the temples are in the upward pivoted position.
Figure 20:
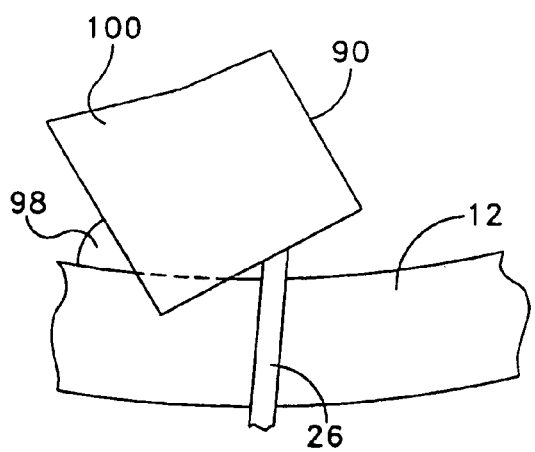
FIG. 20 is a partial side view of an attaching portion of FIG. 18 as it is moved over the top or terminal edge of the cap inner band.
Figure 21:
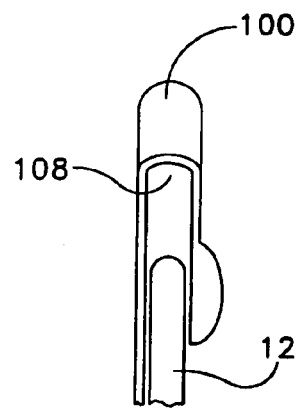
FIG. 21 is a rear elevational view showing how the outwardly bent lip provides a lead into the internal groove of the attaching portion.

The previous discussion in relation to FIGS. 1–16 primarily focused on utilizing the glasses and their mounting system when wearing the cap in the backwards position, that is, with the brim or visor positioned to the rear. FIGS. 17–26 depict the mounting system with the brim facing forward, but it should be recognized that the structural features discussed can be equally utilized when the cap is worn facing rearward, that is, with the brim or visor portion facing rearward. FIG. 17 shows the glasses 10 mounted to the headband 12 of the cap 13 via a modified form of connecting portions 90 similar to connecting portions 60 as shown in FIGS. 10–16 but wherein the outer flange 94 of the connected flanges 92, 94 is provided with a generally circular tab 96 extending from the lower portion of the inner flange 92 and including a forwardly extending lateral edge surface 98. The tab 96 is outwardly bent along line 99 and thus surface 98 serves as a lead-in similar to lead-in 42 but extending from the forward lateral edge rather than the bottom edge of the flange. In this manner, the lead-in tabs 96 are positioned in a downward attitude when the glasses are in their extended position shown in FIGS. 18, 19 and positioned essentially within the cap and above the hat or cap band 12 as depicted in FIGS. 20 and 21.

Figure 23A:
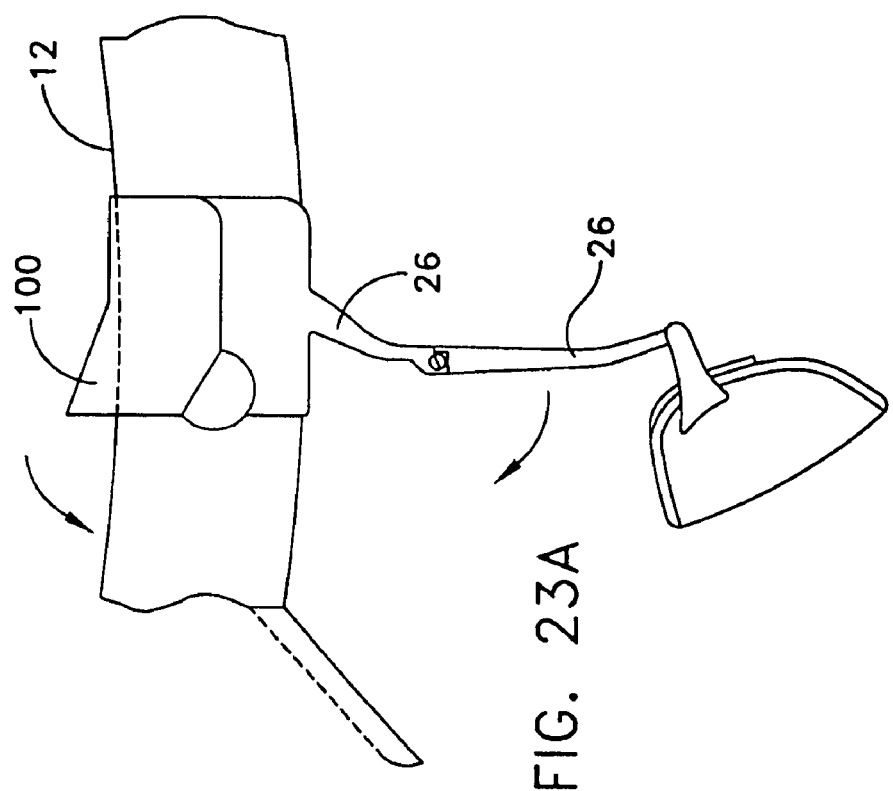
FIG. 23A is a side elevational view of the device shown in FIG. 21 but showing one of the attaching portions of the device mounted to the inner brim of a cap and positioned with the cap brim or bill in the forward facing position.
Figure 23B:
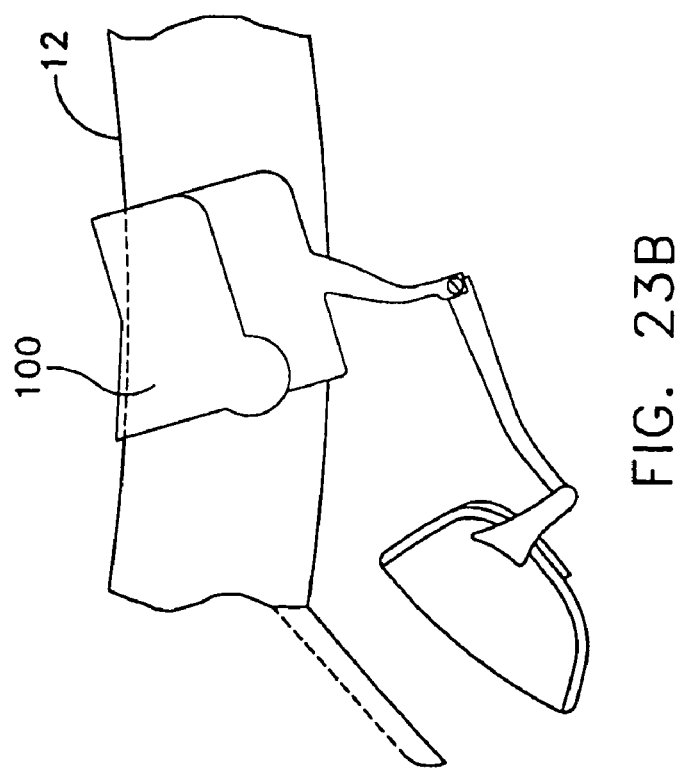
FIG. 23B is a view similar to FIG. 23A but showing the progressive movement of the device when it is upwardly pivoted to the storage position.

A further important constructional feature is the inclusion of a ramp 100 forwardly upwardly extending in the U-shaped bend 106 that connects the inner flange 102 to the outer flange 104 which forms the grooves 108 into which the opposite sides of the headband are received. Since caps vary to a considerable extent, their brims can be positioned at various angles to the cap portion. In some cases, the brim is angled downwardly from the cap such that inner surface portions thereof are contacted by the glasses when they are pivoted to their storage position beneath the rim. The transition between FIGS. 23A and 23B shows how this undesirable contact may be prevented by the ramp 100. Therein, the ramp 100 enables the connecting portions 90 to rock forwardly to a position where the inner surface of the ramp contacts the upper edge of the band and in that way rearwardly shifts or, in effect, lowers the position of the upwardly pivoted glasses so such that the glasses will not contact the brim undersurfaces. Thus in FIG. 23A, the rear portions of the groove firmly contact the upper edge of the band 12 and tend to stabilize the positioning of the connecting portions; and when the device is upwardly pivoted in the direction of the arrows shown in FIG. 23A, that contact with the upper band edge shifts to that portion of the receiving groove defined by the undersurface areas of the ramp 100.

Figure 25A:
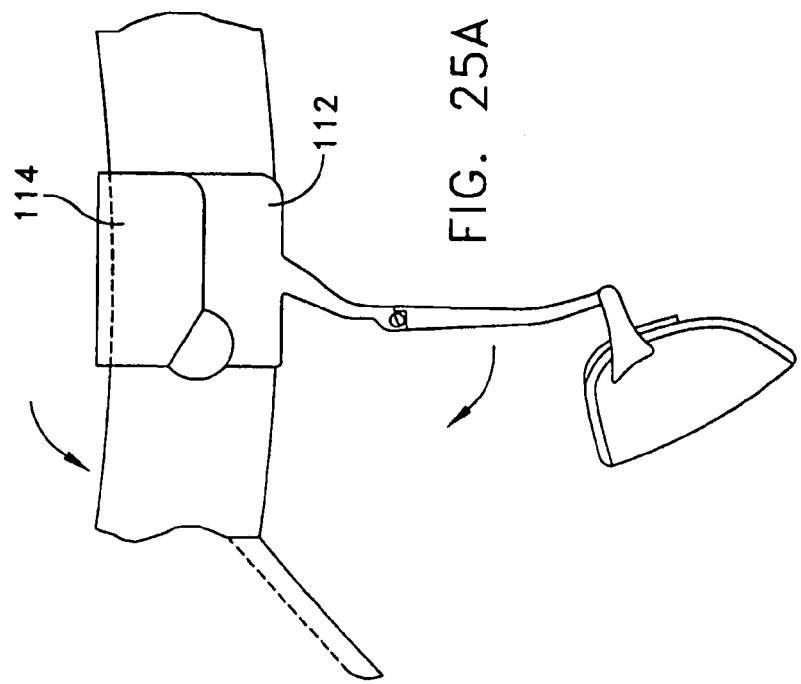
FIG. 25A is a side elevational view similar to FIG. 23A but featuring the rockable attaching portion of FIG. 24.
Figure 25B:
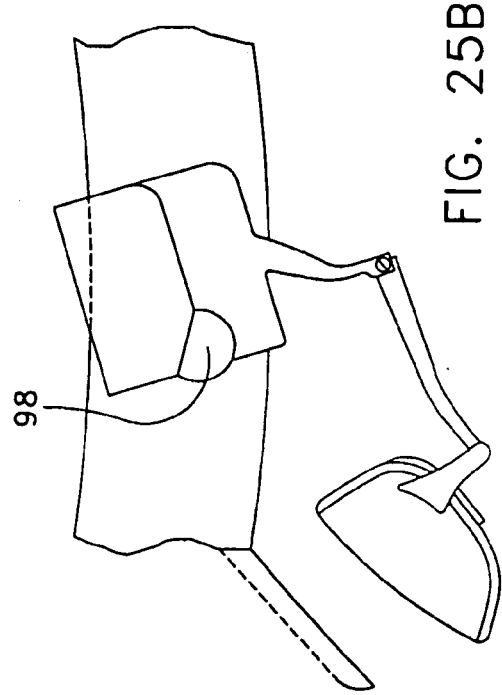
FIG. 25B is a view similar to FIG. 25A but showing the movement of the device in the direction of the arrows shown in FIG. 25A.
Figure 24:
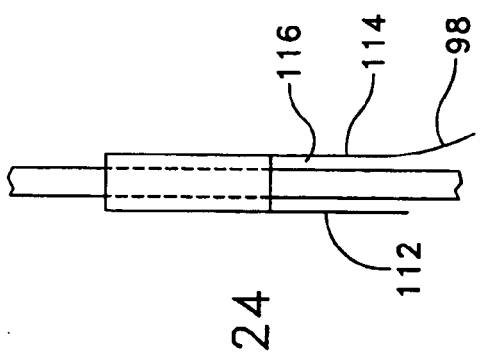
FIG. 24 is a top view similar to FIG. 21 but showing a further rockable attaching portion embodiment.
Figure 28:
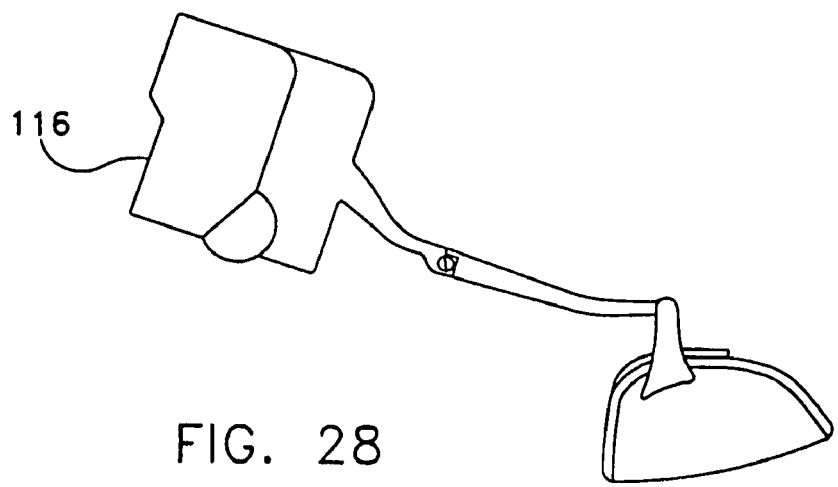
FIG. 28 is a side elevational view of FIG. 24.
Figure 27:
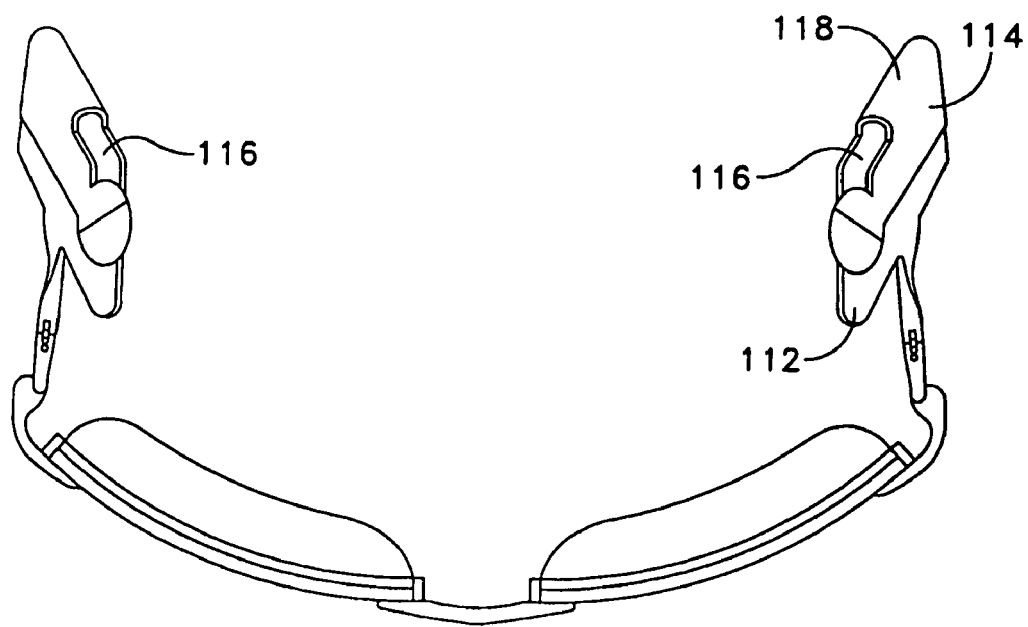
FIG. 27 is a top perspective view of FIG. 26.

A further variation of this rocking action to facilitate increased clearance between the glasses and the brim when the glasses are in the upwardly pivoted storage position and the cap is positioned facing forwardly is shown in FIGS. 24, 25A and 25B. Therein, the forward portion of the U-shaped bend that connects the inner and outer flanges 112 and 114 of the connecting portions 110 are cut away to form a cut-out 116 such that the flanges 112, 114 are connected solely by the web 118. In this manner, the connecting portions are able to rock forwardly downwardly in a manner similar to that depicted by FIGS. 23A, 23B. It should be pointed out that there would be less contact between the groove formed solely by the contact between the undersurfaces of the flanges 112, 114 and the cap band than in the previous embodiment; however in both embodiments, the position of the glasses in both the operative and storage positions is to a large extent brought about by the side to side frictional contact between the cap band and the flanges as these components are, in effect, outwardly forced into the cap shell itself by the wearer's head. This frictional contact is, of course, present to an equal extent whether the cap is worn with the brim or visor portion facing forward or backwards, and the rocking features above described are primarily for positioning of the glasses under the cap brim.

It should be pointed out that the terms "forwardly", "rearwardly", etc. are dependent on the position of the cap on the wearer's head when so applied.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A combination cap and eyeglass assembly mounted thereon wherein the cap includes a top portion, an upstanding headband having an upper terminal edge and positioned about the bottom inside portion of said top portion and a forwardly extending visor, said eyeglass assembly including glasses in turn including a frame and a pair of temples having forward and terminal ends wherein the forward ends thereof are connected to said frame at opposed laterally spaced locations and said temple terminal ends each terminating in a connecting portion for mounting said eyeglass assembly to the headband of said cap at laterally spaced locations thereof, said connecting portions each including an inner flange and an outwardly positioned flange separated therefrom and connected thereto by a generally U-shaped web so as to define a groove between said flanges, each of said grooves positioned over portions of said headband at said opposed laterally spaced locations thereof such that the outer flanges are positioned between and in contact with both said headband and said cap top portion and the inner flanges are positioned and in contact with both said headband and the wearer's head when the cap is positioned on the wearer's head such that the outward force of the wearer's head against the inner flanges stabilizes the position of the connecting portions and that of the glasses.

2. The combination structure of claim 1 wherein each of said: temples include a forward portion connected to said eyeglass frame and a rear portion connected to said forward portion by a pivotable hinge such that said forward portions are upwardly pivotable above said rear portions approximately 90 degrees so as to move said frame from a use position to a storage position while maintaining the attachment between said headband and said connecting portions.

3. The combination structure of claim 2, wherein said outer flanges including an outwardly directed lead-in portion for directing said headband into said groove.

4. The combination structure of claim 3, said lead-in being on the bottom edge of said outer flange.

5. The combination structure of claim 3, said lead-in being on the forward edge of said outer flange.

6. The combination structure of claim 2, wherein the height of said outer flange is less than the height of the inner flange.

7. The combination structure of claim 6, wherein said outer flanges include a lead-in portion outwardly directed from the lower forward edges thereof.

8. The combination structure of claim 2, wherein the connection between the inner and outer flanges includes rocking means positioned at the forward end thereof to enable the connecting portions to move forwardly downwardly vis-à-vis the headband so as to lower the position of the frame.

9. The combination structure of claim 8, said rocking means being an upwardly directed ramp.

10. The combination structure of claim 8, said rocking means being a cut-out recess.

11. An eyeglass assembly adapted for mounting to either the front or rear of a cap having a top portion, an upstanding headband having an upper terminal edge and positioned about the bottom inside portion of said top portion and a forwardly extending visor, said eyeglass assembly including glasses in turn including a frame and a pair of temples having forward and terminal ends wherein the forward ends thereof are connected to said frame at opposed laterally spaced locations and said temple terminal ends each terminating in a connecting portion for mounting said eyeglass assembly to the headband of said cap at laterally spaced locations thereof, said connecting portions each including an inner flange and an outwardly positioned flange separated therefrom and connected thereto by a generally U-shaped web so as to define a groove between said flanges, each of said grooves positioned over portions of said headband at said opposed laterally spaced locations thereof such that the outer flanges are positioned between and in contact with both said headband and said cap top portion and the inner flanges are positioned and in contact with both said headband and the wearer's head when the cap is positioned on the wearer's head such that the outward force of the wearer's head against the inner flanges stabilizes the position of the connecting portions and that of the glasses, wherein each of said temples include a forward portion connected to said eyeglass frame and a rear portion connected to said forward portion by a pivotable hinge such that said forward portions are upwardly pivotable above said rear portions approximately 90 degrees so as to move said frame from a use position to a storage position while maintaining the attachment between said headband and said connecting portion.

12. The eyeglass assembly of claim 11, wherein said outer flanges including an outwardly directed lead-in portion for directing said headband into said groove.

13. The eyeglass assembly of claim 12, said lead-in being on the bottom edge of said outer flange.

14. The eyeglass assembly of claim 12, said lead-in being on the forward edge of said outer flange.

15. The eyeglass assembly of claim 11, wherein the height of said outer flange is less than the height of the inner flange.

16. The eyeglass assembly of claim 15, wherein said outer flanges include a lead-in portion outwardly directed from the lower forward edges thereof.

17. The eyeglass assembly of claim 11, wherein the connection between the inner and outer flanges includes rocking means positioned at the forward end thereof to enable the connecting portions to move forwardly downwardly vis-à-vis the headband so as to lower the position of the frame.

18. The eyeglass assembly of claim 17, said rocking means being an upwardly directed ramp.

19. The eyeglass assembly of claim 17, said rocking means being a cut-out recess.

* * * * *